Jan. 18, 1927.

C. FROESCH 1,614,835

BRAKE MECHANISM

Filed May 29, 1926   3 Sheets-Sheet 1

Inventor
CHARLES FROESCH
By his Attorneys
Redding, Greeley, O'Shea & Campbell

Jan. 18, 1927. 1,614,835
C. FROESCH
BRAKE MECHANISM
Filed May 29, 1926 3 Sheets-Sheet 2
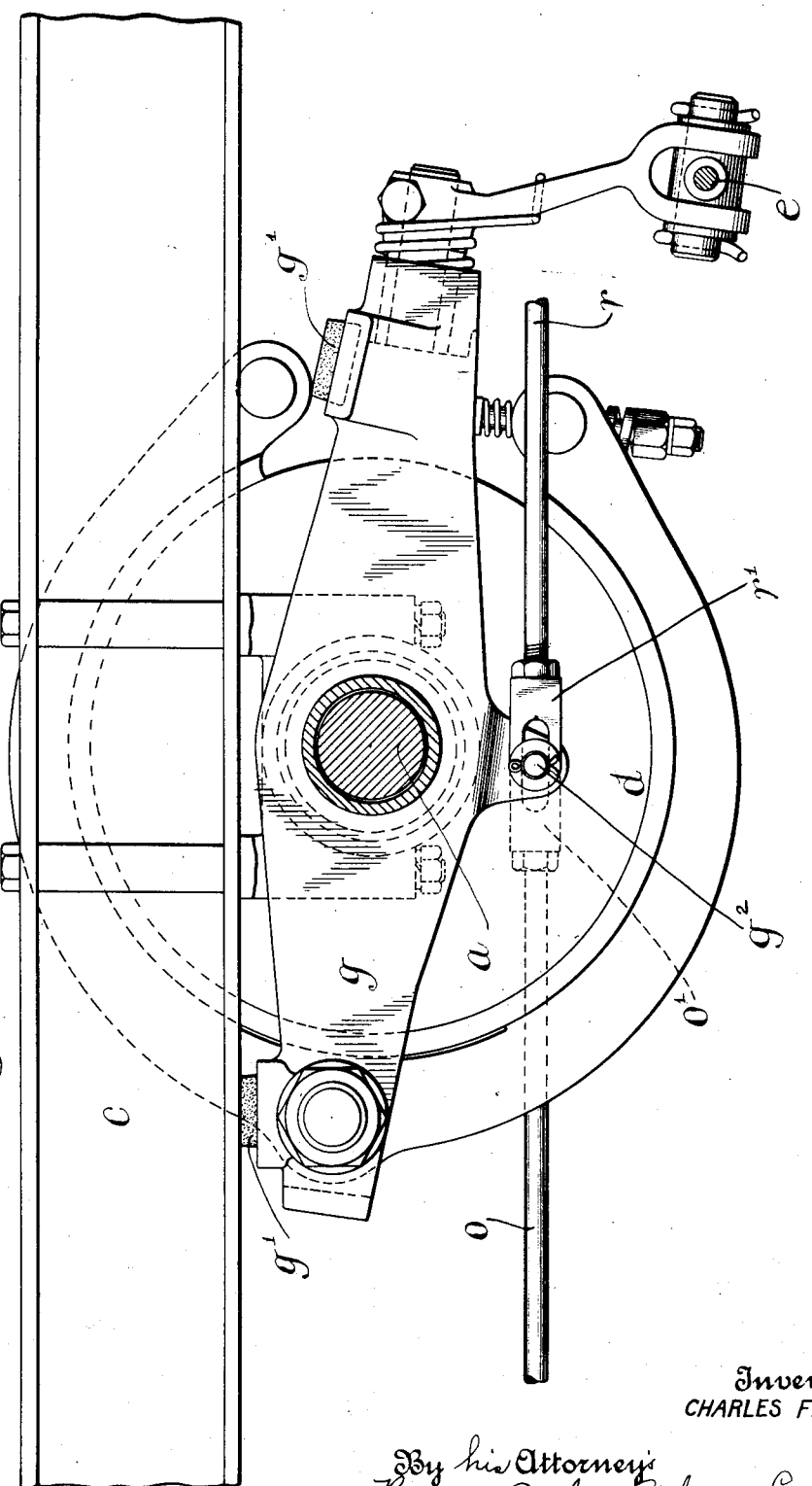
Inventor
CHARLES FROESCH
By his Attorneys
Redding, Greeley, O'Shea & Campbell

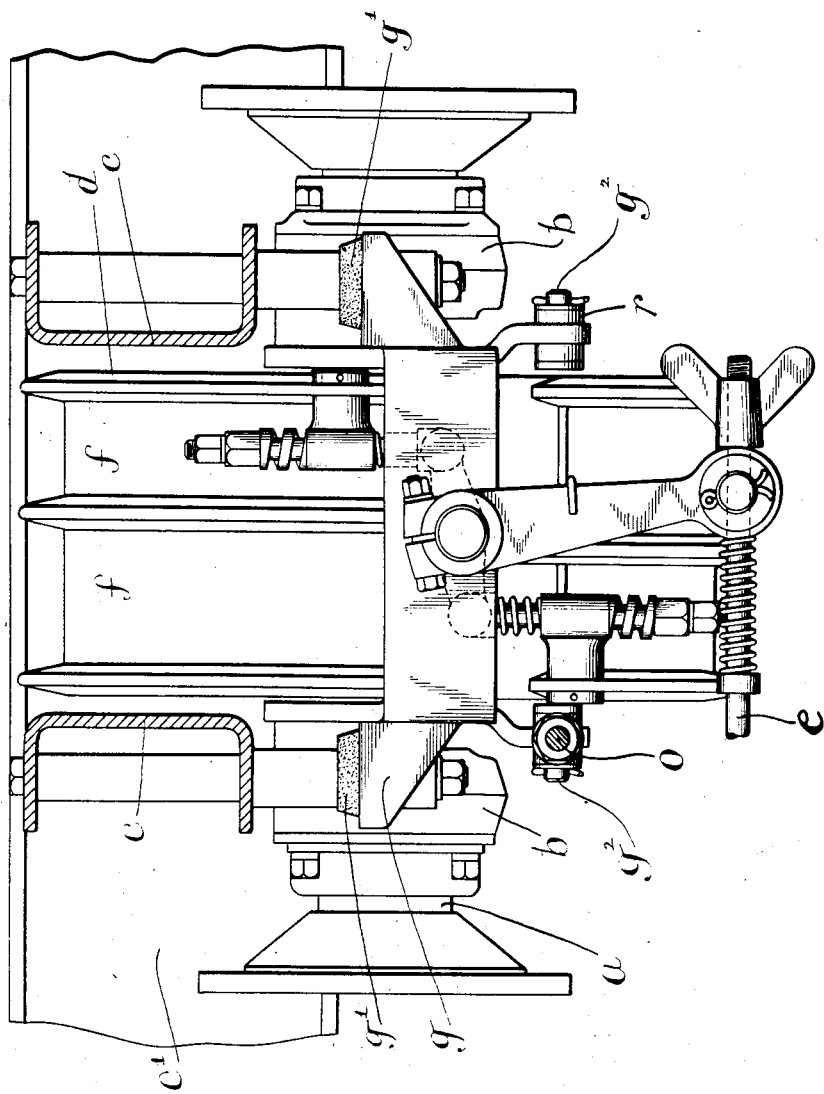

Patented Jan. 18, 1927.

1,614,835

UNITED STATES PATENT OFFICE.

CHARLES FROESCH, OF NEW YORK, N. Y., ASSIGNOR TO INTERNATIONAL MOTOR COMPANY, OF NEW YORK, N. Y., A CORPORATION OF DELAWARE.

BRAKE MECHANISM.

Application filed May 29, 1926. Serial No. 112,438.

In the copending application of Alfred F. Masury and Charles Froesch, U. S. Serial No. 715,297 filed May 23, 1924, there is disclosed a brake mechanism adapted for motor vehicles in which the braking effect is utilized for actuation of other mechanism such as remotely disposed brake mechanism in situations where the first named brake mechanism is associated with the propeller shaft and the last named brake mechanism is associated with one of the wheels of the vehicle. In the preferred embodiment illustrated the brake shoes are mounted upon a movable brake anchor or cradle so that when, as a result of the friction between a brake shoe and brake drum, the brake shoe tends to travel with the drum about its axis, the resulting motion of the cradle is translated to other mechanism for appropriate actuation thereof.

The present invention relates to mechanism of the same general character as that forming the subject matter of the copending application and has for its object the utilization of the movement of the brake anchor cradle, due to the frictional engagement of the shoes with the brake drum, in either direction of rotation of the propeller shaft. Accordingly the cradle is so connected by a system of linkage and levers with remote mechanism that the said mechanism may be actuated upon rotational movement of the cradle in either direction.

In order that the invention may be clearly understood and readily carried into effect the same will now be described more fully with reference to the accompanying drawings illustrating a preferred embodiment thereof, in which:

Figure 2 is a view in end elevation showing, in greater detail, the brake anchor cradle and associated mechanism.

Figure 3 is a view, in side elevation, showing the structure illustrated in Figure 2.

Figure 1:
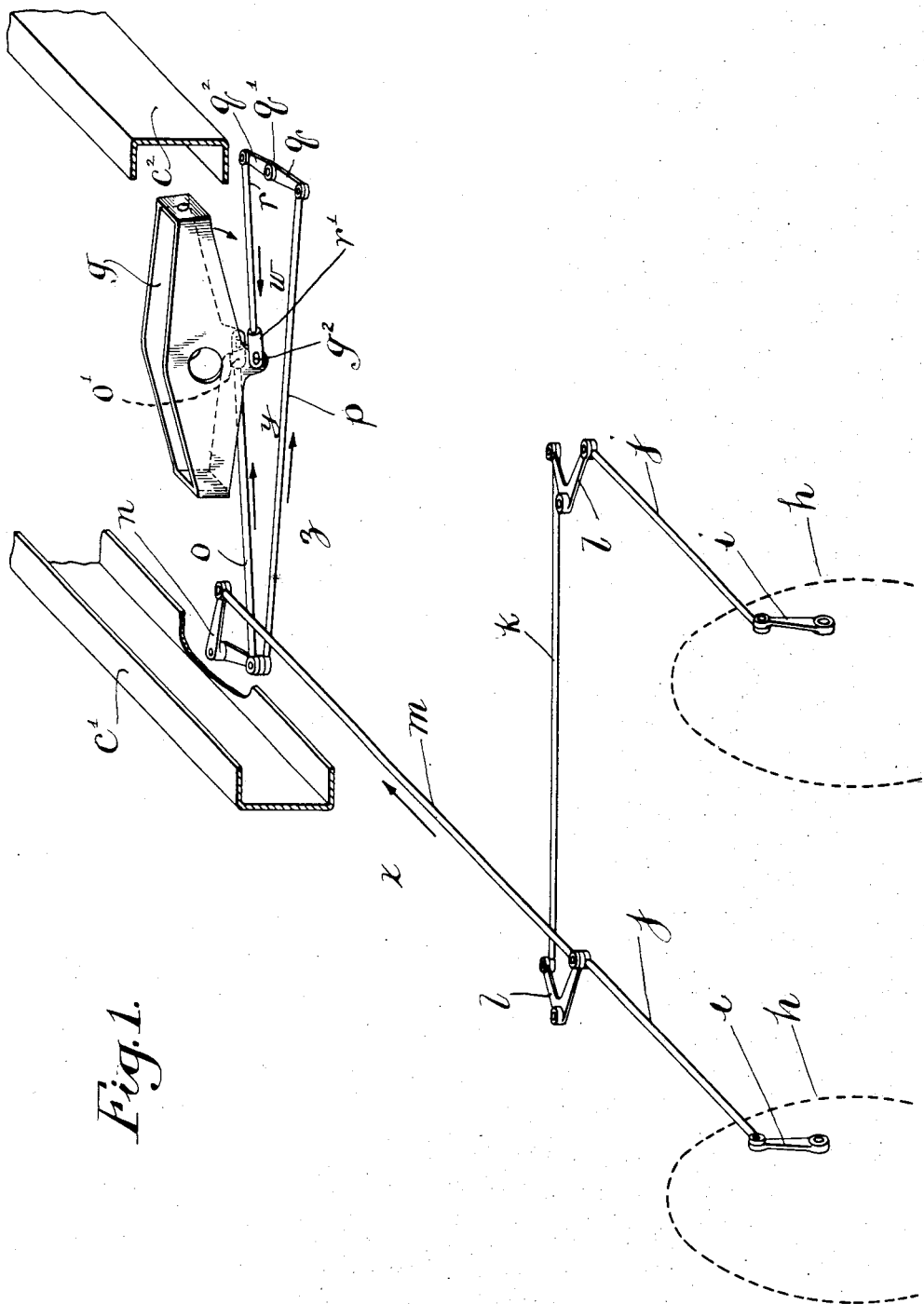
Figure 1 is a view, in perspective, showing the movable brake anchor or cradle and the operative connections with remote brake mechanism according to the invention.

Normally the propeller shaft $a$ turns freely in either direction of rotation in its bearings $b$ carried with the cross frame members $c, c$ of the chassis, and with it the brake drum $d$. To restrain this rotation, manual effort applied to the rod $e$ causes the yielding application of the brake shoes $f$ as will be understood and as the shoes $f$ frictionally engage the drum $d$ they tend to be carried therewith about the propeller shaft axis due to the fact that they are mounted upon the cradle $g$ also rotatably mounted in the bearings $b$ and capable of turning until the buffers $g'$ at either end contact with a frame member $c$.

As in the structure shown in the copending application, remote brake mechanism for the wheels indicated at $h$ is connected to the cradle $g$ by a system of linkage. The present linkage, however, is designed to render the remote mechanism effective upon the turning of the cradle in either direction of rotation. To this end the brake actuating levers $i$ at the wheels are each connected for simultaneous operation through the links $j, j$ and $k$ and bell cranks $l, l$ with a pull rod $m$ extending to a bell crank $n$ carried with the side frame member $c'$ adjacent to the propeller shaft brake and this bell crank $n$ is connected directly to the cradle $g$ by the link $o$ and also through the link $p$ to one arm $q$ of the lever $q'$ fulcrumed on the other side frame member $c^2$, the other arm $q^2$ of which is directly connected with the anchor cradle $g$ by the link $r$.

Obviously to effect the operation of the remote mechanism the pull rod $m$ must always be moved axially in the direction of the arrow $x$ and consequently the arms of the bell crank $n$ must always rotate in a counterclockwise direction as viewed from above in Figure 1. Hence both links $o$ and $p$ must always move in the direction of the arrows $y$ and $z$. If, then, the cradle $g$ is rotated in a clockwise direction, as viewed in Figure 1, a pull will be exerted on the link $r$ in the direction of the arrow $w$ which will effect the pivotal movement of lever $q'$ to exert a pull on the link $p$ in the direction of the arrow $z$. Both devices $r'$ and $o'$ are so constructed as to permit lost motion with the pins $q^3$ in order that the rotation of the cradle will not affect adversely the direction of movement of the links $r$ and $o$ as will be understood.

By the construction described a servo-brake mechanism is afforded which is operative in either direction of rotation of the propeller shaft with equal effect.

The invention is not to be deemed limited to the precise configuration or disposition of the coacting elements going to make up the mechanism as a whole nor to the particular application thereof illustrated in the drawings, but is to be given a scope commensurate with the appended claim.

What I claim is:

In a vehicle, in combination, a transverse chassis frame member, a propeller shaft supported by the transverse chassis frame member, a brake drum carried with the propeller shaft, brake shoes for engagement with said brake drum, a brake shoe anchor pin, an anchor cradle carried rotatably with the propeller shaft and being fixed at one end to the anchor pin and being adapted to carry at its other end means to actuate the brake shoes, buffers at both ends of the cradle for abutment against the transverse chassis frame member to prevent motion of the cradle upon application of the brake shoes beyond a predetermined point, arms carried with the cradle, remote brake actuating devices, means comprising a system of links and levers connected to said arms and to said remote brake actuating devices to cause operation of the remote brake actuating devices upon rotational movement of the cradle in either direction.

This specification signed this 27 day of May A. D. 1926.

CHARLES FROESCH.